United States Patent
Matthews, III et al.

(10) Patent No.: US 12,313,512 B2
(45) Date of Patent: May 27, 2025

(54) FLUID DIODE

(71) Applicant: Halliburton Energy Services, Inc., Houston, TX (US)

(72) Inventors: Kenneth H Matthews, III, Kingwood, TX (US); Michael T. Pelletier, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 223 days.

(21) Appl. No.: 17/953,907

(22) Filed: Sep. 27, 2022

(65) Prior Publication Data
US 2024/0068358 A1    Feb. 29, 2024

Related U.S. Application Data

(60) Provisional application No. 63/401,090, filed on Aug. 25, 2022.

(51) Int. Cl.
| | | |
|---|---|---|
| *G01N 11/08* | (2006.01) | |
| *E21B 47/10* | (2012.01) | |
| *F15D 1/00* | (2006.01) | |
| *G01N 11/14* | (2006.01) | |

(52) U.S. Cl.
CPC ........... *G01N 11/08* (2013.01); *F15D 1/0015* (2013.01); *G01N 11/14* (2013.01); *E21B 47/10* (2013.01)

(58) Field of Classification Search
CPC .. E21B 47/0621; E21B 47/07; E21B 49/0875; E21B 49/08; G01N 11/08; G01N 11/14; F15D 1/0015
See application file for complete search history.

(56) References Cited

U.S. PATENT DOCUMENTS

| | | | | |
|---|---|---|---|---|
| 6,047,239 | A | * | 4/2000 | Berger .................... E21B 49/08 |
| | | | | 702/9 |
| 6,755,079 | B1 | | 6/2004 | Proett et al. |
| 2009/0184275 | A1 | | 7/2009 | Ruschke et al. |
| 2012/0211243 | A1 | * | 8/2012 | Dykstra .................. E21B 43/08 |
| | | | | 166/373 |
| 2013/0037275 | A1 | | 2/2013 | Noui-Mehidi |
| 2015/0261224 | A1 | * | 9/2015 | Lopez .................... G05B 15/02 |
| | | | | 700/282 |
| 2016/0305216 | A1 | | 10/2016 | Fripp et al. |

FOREIGN PATENT DOCUMENTS

| | | |
|---|---|---|
| EP | 3423721 B1 | 12/2020 |
| WO | 2009048822 A2 | 4/2009 |

OTHER PUBLICATIONS

International Search Report & Written Opinion; PCT Application No. PCT/US2022/045053; mailed May 17, 2023.

* cited by examiner

*Primary Examiner* — Yanick A Akaragwe
(74) *Attorney, Agent, or Firm* — NOVAK DRUCE CARROLL LLP

(57) ABSTRACT

Systems and techniques are described for a fluid diode. In some examples, a fluid diode can include a first fluid path for a first flow of fluid to traverse the fluid diode via a first flow direction and a second fluid path for a second flow of fluid to traverse the fluid diode via a second flow direction. The first flow direction can be associated with a first pressure drop and the second flow direction can be associated with a second pressure drop that is different than the first pressure drop. Moreover, the first fluid path and the second fluid path can be configured to remain open to the first flow and the second flow in the first flow direction and the second flow direction.

18 Claims, 13 Drawing Sheets

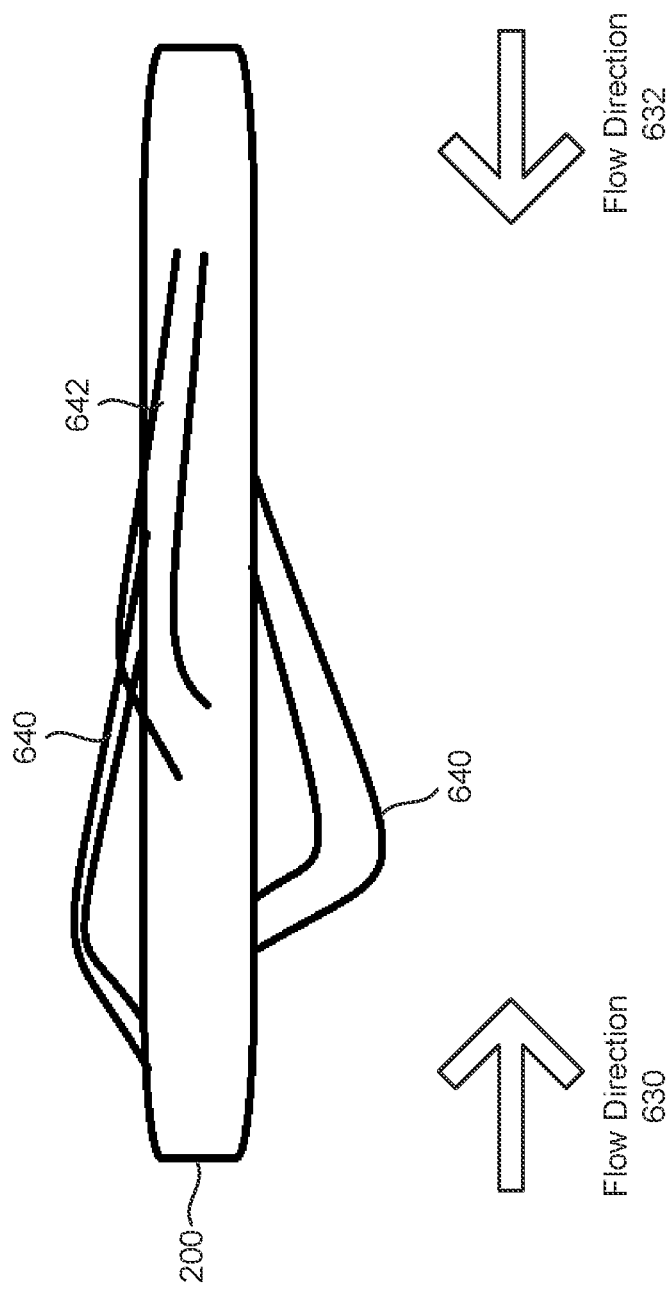

700

INSERTING A FLUID DIODE WITHIN A CAVITY OF A HOUSING ELEMENT
702

COUPLING THE FLUID DIODE WITH A BASE ELEMENT ELEMENT
704

MEASURING, VIA ONE OR MORE MEASUREMENT DEVICES, ONE OR MORE CHARACTERISTICS OF FLUID FLOWING THROUGH A FIRST FLUID PATH ON THE FLUID DIODE AND/ OR A SECOND FLUID PATH ON THE FLUID DIODE
706

FIG. 7

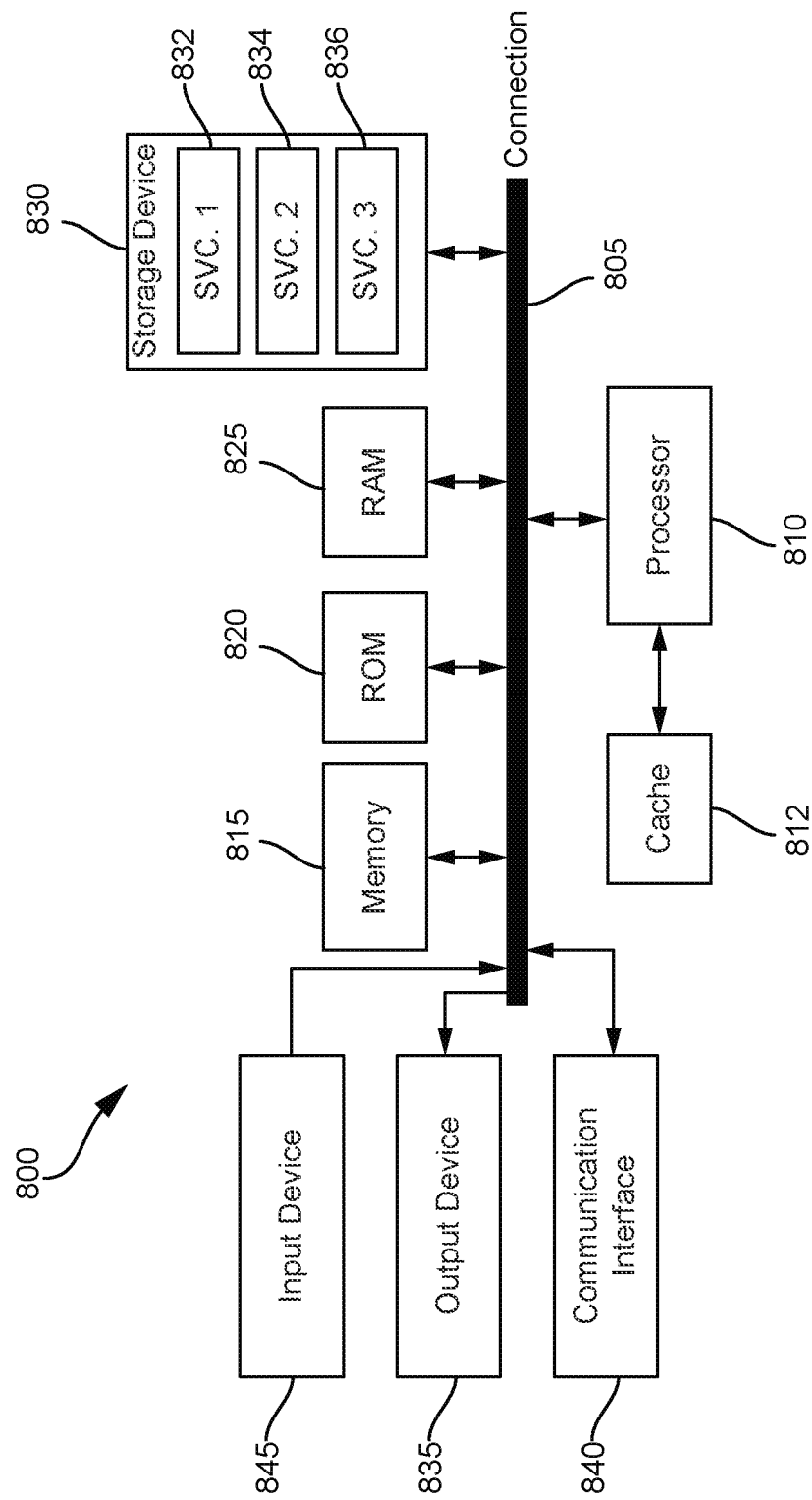

FLUID DIODE

CROSS-REFERENCE TO RELATED APPLICATIONS

This application claims benefit to U.S. Provisional Application No. 63/401,090 filed Aug. 25, 2022, which is incorporated herein by reference.

TECHNICAL FIELD

The present disclosure generally relates to fluid diodes. For example, aspects of the present disclosure relate to systems and techniques for implementing fluid diodes that can be used to change or control the characteristics of a flow, generate torque, and/or measure characteristics of fluids that flow through the fluid diode.

BACKGROUND

Various types of sensors are increasingly used in wellbore operations to measure downhole conditions such as, for example, magnetic fields, pressure, physical properties of downhole fluids (e.g., viscosity, etc.), torque of one or more downhole elements, etc. For example, viscometers can be deployed at a downhole location to measure a viscosity of fluids at the downhole location. Unfortunately, space and power resources are very limited in downhole environments. Such space and power constraints create significant challenges in deploying sensors and devices downhole. To illustrate, traditional viscometers generally require a source of power to drive an agitator element to generate vibrations or perturbations in a fluid downhole. The vibrations or perturbations in the fluid are used to measure the viscosity of the fluid. However, given the space and power constraints downhole and the power and space requirements of traditional viscometers, it can be difficult to deploy such traditional viscometers in downhole locations. Moreover, the source of power and agitator element used by traditional viscometers to operate disadvantageously utilize some of the limited space and power resources in the downhole environment.

In addition, the operation of sensors and devices deployed downhole can be negatively affected by various conditions in a downhole environment, such as high temperatures, high pressures, complex mixtures of different elements, etc. For example, the accuracy of measurements taken by downhole sensors and/or the sensitivity of such sensors can be negatively affected by the various conditions in the downhole environment. Moreover, the devices in the downhole environment can accumulate dirt and can be difficult to change or clean to ensure proper operation.

BRIEF DESCRIPTION OF THE DRAWINGS

Illustrative examples and aspects of the present application are described in detail below with reference to the following figures:

FIG. 6B is a diagram illustrating example flows traversing a fluid diode, in accordance with some examples of the present disclosure.

FIG. 7 is a flowchart illustrating an example process for implementing a fluid diode, according to some aspects of the present disclosure.

FIG. 8 illustrates an example computing device and hardware that can be used to implement some aspects of the present disclosure.

DETAILED DESCRIPTION

Figure 1A:
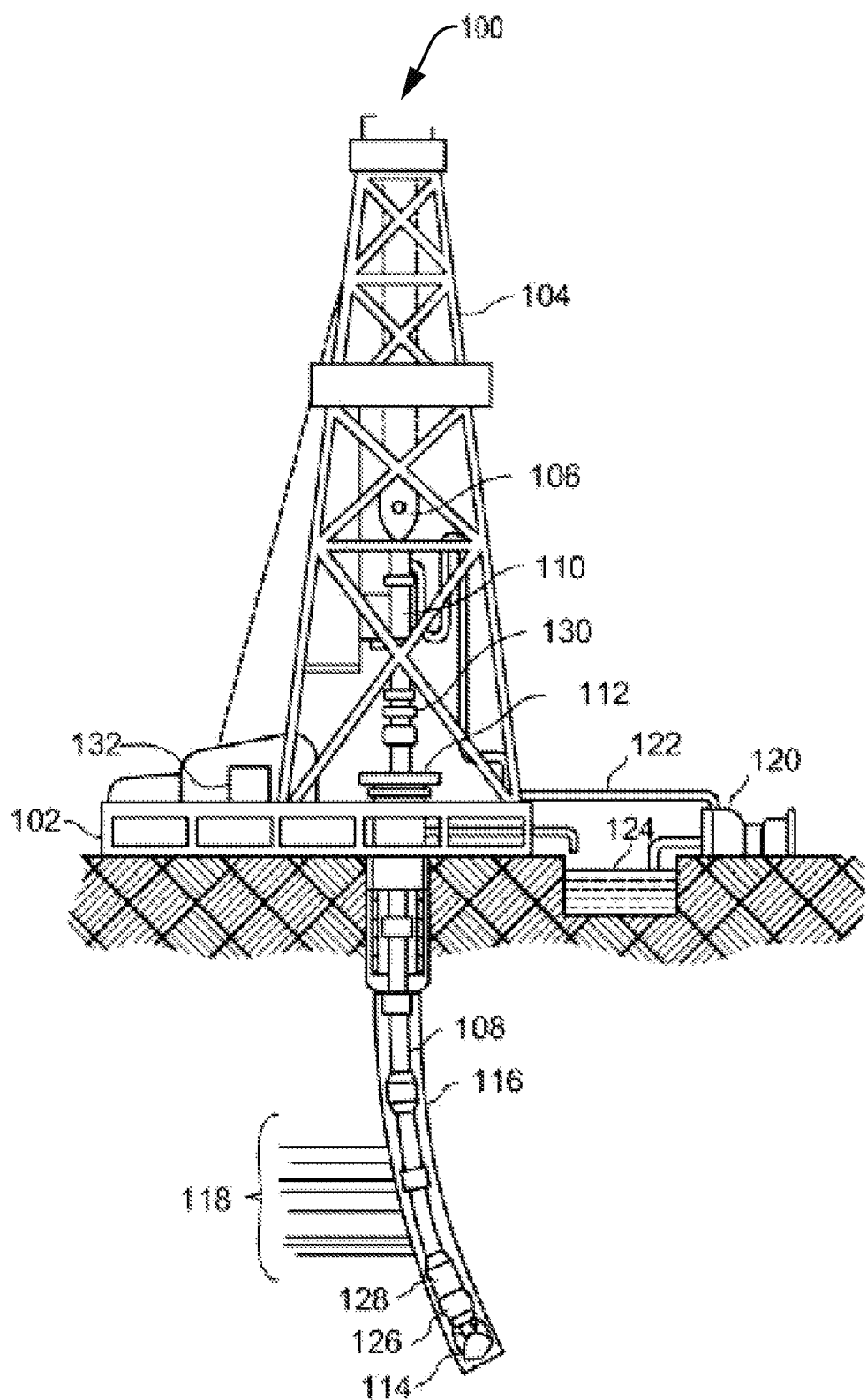
FIG. 1A is a schematic side-view of an example wireline logging environment, in accordance with some examples of the present disclosure.

Various aspects and examples of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, techniques, systems, apparatuses, methods (also referred to as processes herein), non-transitory computer-readable media, and their related results according to the examples and aspects of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Various types of sensors and devices can be used in wellbore operations to measure or control downhole conditions such as, for example, to measure a magnetic field, measure pressure, measure torque, measure physical properties of downhole fluids (e.g., viscosity, composition, etc.), control a fluid flow, etc. For example, a control device can be deployed in a downhole environment to control the flow of fluids from one location (and/or direction) to another location (and/or direction). In some cases, the control device can control a flow path and/or pressure and provide a resistance or pressure to control or modify one or more characteristics of a fluid flow. In some cases involving fluids with multiple components (e.g., gas, oil, water, etc.), the control device can be used to control a fluid flow in order to modify or control a production of a particular constituent of the fluid.

For example, a fluid in a downhole environment can have multiple fluid components such as oil, gas, and water. The characteristics of the fluid flow, such as the viscosity of the fluid, can change as the fluid components change (e.g., a fluid with a higher proportion of oil will have a different viscosity than a fluid with a higher proportion of gas or water and a lower proportion of oil). In a downhole environment, it may be desirable to reduce or eliminate a fluid component (e.g., gas, oil, or water) to increase or maximize production of another fluid component. A control device downhole can be used to control the flow of fluids and thereby selectively change the production of specific fluid components.

In some cases, viscometers can be deployed at a downhole location to measure a viscosity of fluids at the downhole location. However, the amount of space and power resources available at downhole locations is very limited. The space and power constraints in downhole locations thus create significant challenges in deploying sensors and devices downhole. For example, viscometers often operate based on a bob and shaft where either the bob or shaft is turned by an external force to create vibrations or perturbations in a fluid being measured. The viscometer can then measure the viscosity of the fluid based on the vibrations or perturbations in the fluid. The external force used to turn the bob or shaft is generally supplied by a power source, which increases the size and power requirements of the viscometers in the downhole environment. The size requirements of such viscometers are further increased by the bob and shaft used to create the vibrations or perturbations. Given the space and power constraints in downhole environments and the power and space requirements of such viscometers, it can be difficult to deploy the viscometers in downhole locations.

Systems, apparatuses, processes (also referred to as methods), and computer-readable media (collectively referred to herein as "systems and techniques") are described herein for a fluid diode. The fluid diode can be used to, for example and without limitation, change the characteristics of a fluid flow, generate torque, measure a viscosity of fluids flowing through the fluid diode, measure a flow rate, measure a torque, control or modify certain devices and/or processes (e.g., open or closes orifices, apply pressure to a device or area, etc.), among other things. The fluid diode can include or can be a compact, modular, safe, and/or cleanable unit or system capable of performing various operations such as, for example, measuring a fluid's viscosity in a flow, measuring a torque generated by fluid flowing through the diode, etc. For example, the systems and techniques described herein can be used to measure a viscosity of a fluid traversing or flowing through the fluid diode. The viscosity can be measured as a differential pressure or net force. Moreover, the fluid diode can include a first flow path associated a higher differential pressure (e.g., than that of a second flow path) and a second flow path associated with a lower differential pressure (e.g., than that of the first flow path). In some cases, the second flow path can be used to provide a reverse flow direction (e.g., relative to the flow direction of the first flow path) that has a different (e.g., lower, higher, etc.) differential pressure than the flow direction of the first flow path.

In some examples, the fluid diode can include a pressure vessel with a fluid area. The pressure vessel and/or the fluid area can include a particular shape such as, for example and without limitation, a tapered shape (e.g., a cone shape), a braded shape, or any other shape. An annulus of a system in a downhole environment (e.g., an annulus of a drill string, an annulus of a wellbore tool, etc.) can include an annulus element having a matching or similar shape (e.g., a tapered/cone shape, etc.). Moreover, the fluid diode can include threads on a surface of the fluid diode. The threads in the can match or can be similar to threads in the annulus element. The fluid diode can be installed in or within the annulus element. In some examples, the fluid diode can include offset ports that create a fluid path. In some cases, the fluid path from a set of ports can be different than a fluid path from a different set of ports and/or channels created by the fluid diode.

If the fluid diode is used as or includes a flow diverter and viscometer, one flow direction and/or fluid path can provide a fluid traversing the fluid diode a higher contact time than another flow direction and/or fluid path. In some examples, threads on a surface of the fluid diode can act as channels for fluid to flow. For example, the threads can create a fluid path for a flow traversing the fluid diode. In some cases, a fluid flowing across the fluid diode and applying a force on the threads can create torque. For example, a fluid flowing through the threads can create and/or apply a force on the fluid diode, which can cause the fluid diode to move (e.g., rotate, etc.). The flow rate of the fluid and/or the amount of torque generated by the fluid and/or the fluid diode (e.g., via the threads) can be measured using one or more measuring devices associated with the fluid diode such as, for example, a magnetic reading device, an acoustic reading device, an imbedded strain gauge, and/or any other sensing/reader device.

The threaded configuration and/or dimensions of the fluid diode can allow the fluid diode to be rotated without an electrically-powered external force applied on the fluid diode. For example, the fluid diode can be rotated by the force applied on the fluid diode by a fluid flowing through a channel(s) of the fluid diode created by the threads of the fluid diode. In some examples, the design of the fluid diode can allow a flow to be measured/tested in a particular direction, allowing for inline processes to be implemented in a particular flow direction. Moreover, the design of the fluid diode can facilitate the cleaning of the fluid diode and can allow implementation of interchangeable fluid diode plugs. The interchangeable fluid diode plugs can allow for custom designs and matching fluids. In some examples, the dimensions of the annulus and/or the threads/fins associated with the fluid diode can be changed with a different fluid diode plug, thereby changing the scale of viscosity of fluids. The configuration of the fluid diode system can allow the flow through the system to be reversed. In some examples, operationally reversing the flow through the system can allow the fluid diode system to be used with differing varicosities. In some cases, the fluid diode can provide different paths for fluid flows and can be associated with different pressure drops. For example, the fluid diode can include a first path for fluid flowing in a first direction and having a first pressure drop, and a second path for fluid flowing in a different direction and having a different pressure drop.

In some examples, the systems and techniques described herein can be used to measure gas and reverse flow fluids (e.g., water, oil, mixtures, etc.) and/or heavy oils. If the fluid diode is used in a system with a sudden loss or up-stream pressure, a rupture or blow down device can act as a flow limiter (e.g., similar to a surge check) that allows for a reduced flow to bleed down safely. In some cases, the fluid diode can be used as a shearing element for polymers. Moreover, the fluid diode can be used as a mixer. For example, the fluid diode can be used as a downhole chemical blender (e.g., mixing epoxies for a patch on composite liner). A reversing valve system implemented with the fluid diode can be used to blend chemicals/fluids to a homogeneous steady state viscosity rather than through time blending. In some cases, the viscosity of fluids measured by the system can provide an indication of a remaining "pot life" of one or more epoxy systems. For example, the viscosity of a fluid can include or represent a measure of the remaining "pot life" of various epoxy systems.

Examples of the systems and techniques described herein for implementing a fluid diode are illustrated in FIG. 1A through FIG. 8 and described below.

FIG. 1A is a diagram illustrating an example logging while drilling (LWD) environment, in accordance with some examples of the present disclosure. As shown, in this example, drilling platform 102 supports derrick 104 having traveling block 106 for raising and lowering drill string 108. Kelly 110 supports drill string 108 as it is lowered through rotary cable 112. Drill bit 114 is driven by a downhole motor and/or rotation of drill string 108. As drill bit 114 rotates, it drills a borehole 116 that passes through various formations 118. Pump 120 circulates drilling fluid through a feed pipe 122 to kelly 110, downhole through the interior of drill string 108 and orifices in drill bit 114, back to the surface via the annulus around drill string 108 and into retention pit 124. The drilling fluid transports cuttings from the borehole into pit 124 and aids in maintaining borehole integrity.

Downhole tool 126 can take the form of a drill collar (e.g., a thick-walled tubular that provides weight and rigidity to aid the drilling process) or any other known and/or suitable arrangements. Further, downhole tool 126 can include acoustic (e.g., sonic, ultrasonic, etc.) logging tools and/or corresponding components, integrated into the bottom-hole assembly near drill bit 114. In this fashion, as drill bit 114 extends the borehole through formations, the bottom-hole assembly (e.g., the logging tool) can collect logging data. For example, logging tools can include transmitters (e.g., monopole, dipole, quadrupole, etc.) to generate and transmit signals/waves into the borehole environment, such as acoustic signals/waves. These signals propagate in and along the borehole and surrounding formation and create signal responses or waveforms, which are received/recorded by one or more receivers, such as a set of evenly spaced receivers. These receivers may be arranged in an array and may be evenly (or otherwise) spaced apart to facilitate capturing and processing response signals at specific intervals. The response signals are further analyzed to determine borehole and adjacent formation properties and/or characteristics. Depending on the implementation, other logging tools may be deployed. For example, logging tools configured to measure electric, nuclear, gamma and/or magnetism levels may be used. Logging tools can also be implemented to measure pressure, measure fluid viscosity, measure temperature, perform fluid identification, measure a tool orientation, and/or obtain any other measurements.

For purposes of communication, a downhole telemetry sub 128 can be included in the bottom-hole assembly to transfer measurement data to surface receiver 130 and to receive commands from the surface. Mud pulse telemetry is one example telemetry technique for transferring tool measurements to surface receivers and receiving commands from the surface. However, other telemetry techniques can also be used including, for example and without limitation, fiber optic telemetry, electric telemetry, acoustic telemetry through the pipe, electromagnetic (EM) telemetry, etc. In some aspects, telemetry sub 128 can store logging data for later retrieval at the surface when the logging assembly is recovered.

At the surface, surface receiver 130 can receive the uplink signal from the downhole telemetry sub 128 and can communicate the signal to data acquisition module 132. Module 132 can include one or more processors, storage media, input devices, output devices, software, and/or the like. Module 132 can collect, store, and/or process the data received from tool 126 as described herein.

Figure 1B:
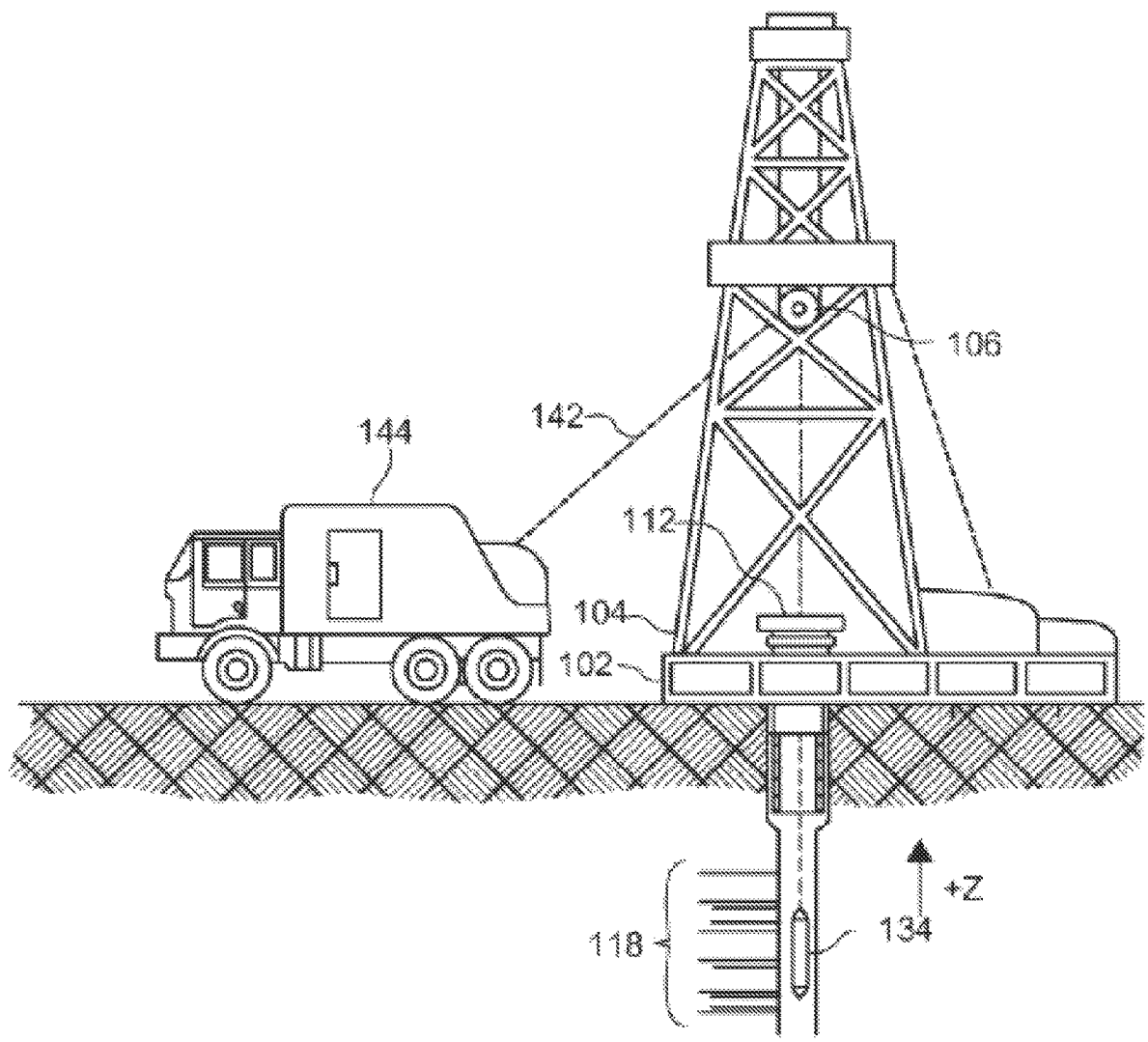
FIG. 1B is a schematic side-view of the example logging environment of FIG. 1A, in accordance with some examples of the present disclosure.

At various times during the process of drilling a well, drill string 108 may be removed from the borehole as shown in FIG. 1B. Once drill string 108 has been removed, logging operations can be conducted using a downhole tool 134 (e.g., a sensing instrument sonde) suspended by a conveyance 142. In one or more examples, conveyance 42 can be a cable having conductors for transporting power to the tool and telemetry from the tool to the surface. Downhole tool 134 may have pads and/or centralizing springs to maintain the tool near the central axis of the borehole or to bias the tool towards the borehole wall as the tool is moved downhole or uphole.

In some examples, downhole tool 134 can include an acoustic or sonic logging instrument that collects acoustic logging data within the borehole 116. As mentioned above, other logging instruments may additionally or alternatively be used. A logging facility 144 includes a computer system, such as the computer system 800 described with reference to FIG. 8, for collecting, storing, and/or processing the data/measurements gathered by logging tool 134. In one or more examples, the conveyance 142 of the downhole tool 134 may include at least one of wires, conductive or non-conductive cable (e.g., slickline, etc.), and/or tubular conveyances such as coiled tubing, pipe string, or downhole tractor. Downhole tool 134 can have a local power supply, such as batteries, a downhole generator, and/or the like. When employing a non-conductive cable, coiled tubing, pipe string, or a downhole tractor, communication can be supported using, for example, wireless protocols (e.g., EM, acoustic, etc.), and/or measurements and logging data may be stored in local memory for subsequent retrieval. In some aspects, electric or optical telemetry is provided using conductive cables and/or fiber optic signal-paths.

Although FIGS. 1A and 1B depict specific borehole configurations, it should be understood that the present disclosure is suited for use in wellbores having other orientations including vertical wellbores, horizontal wellbores, slanted wellbores, multilateral wellbores, and the like. While FIGS. 1A and 1B depict an onshore operation, it should also be understood that the present disclosure is suited for use in offshore operations. Moreover, the present disclosure is not limited to the environments depicted in FIGS. 1A and 1B, and can also be used in other well operations such as, for example and without limitation, production tubing operations, jointed tubing operations, coiled tubing operations, combinations thereof, and/or the like.

Figure 2:
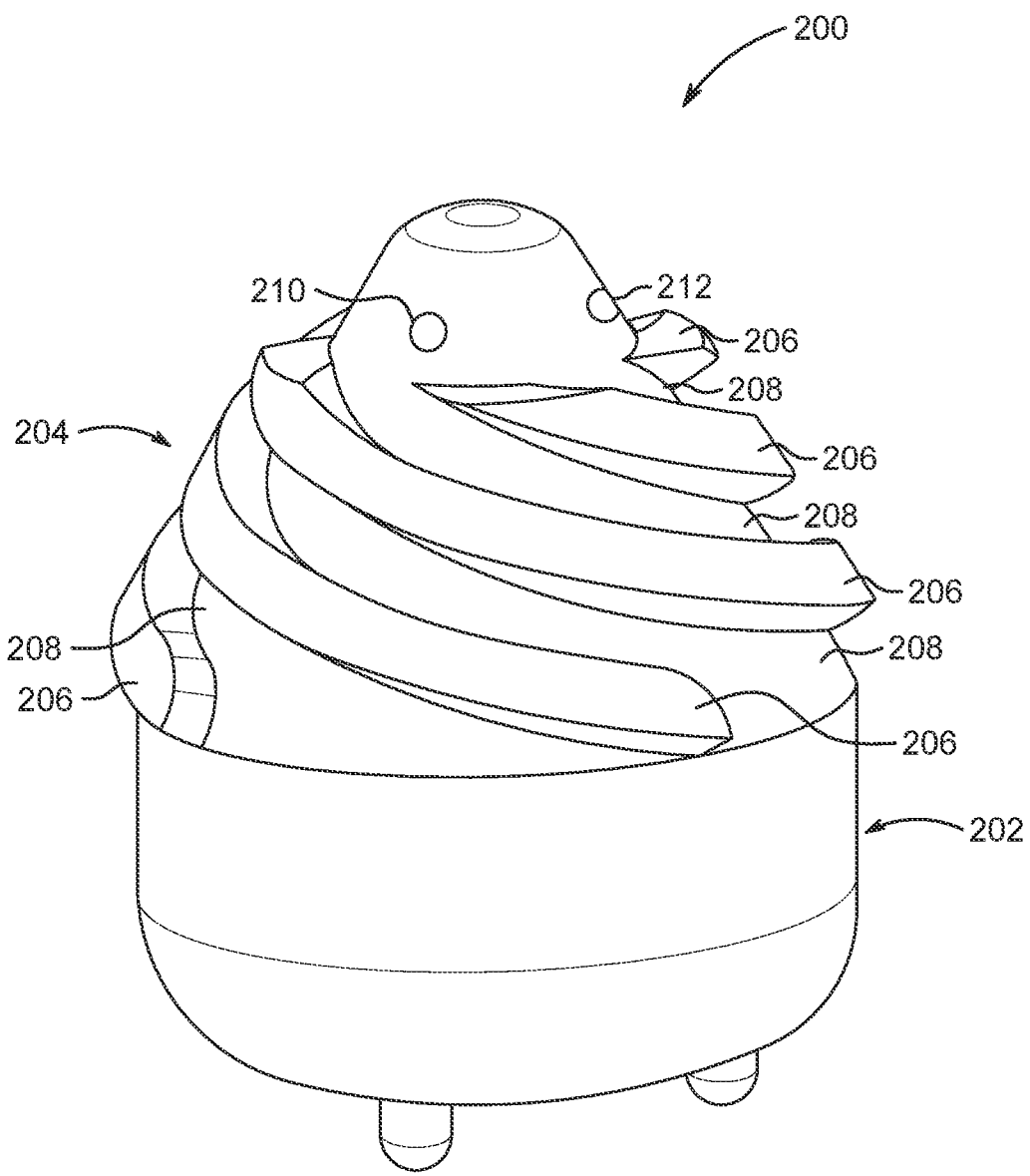
FIG. 2 illustrates an example fluid diode in accordance with some examples of the present disclosure.

FIG. 2 illustrates an example fluid diode 200 in accordance with some examples of the present disclosure. In this example, the fluid diode 200 can include a tapered (e.g., cone shaped) portion 204. In other examples, the fluid diode 200 can include a portion having a different shape such as, for example and without limitation, a braded shape, a curved shape, a slanted shape, etc. For clarity and explanation purposes, the fluid diode 200 will be described throughout as having a portion (e.g., tapered portion 204) having a tapered shape. However, one of ordinary skill in the art will recognize that the tapered shape is merely one illustrative example shape of the portion 204, and other implementations can include a different shape as previously noted.

In some cases, the fluid diode 200 can also optionally include a base 202. Moreover, the tapered portion 204 can include threads 206 (and/or other shapes/configurations designed to create channels). As shown in FIG. 2, the threads 206 can go at least partially around the tapered portion 204 of the fluid diode 200 from a higher (or top) portion of the tapered portion 204 to a lower (or bottom) portion of the tapered portion 204. The threads 206 can create channels 208 for fluids in a downhole environment (or any other environment) to flow from a portion (e.g., a top or higher portion) of the tapered portion 204 (and the channels 208) to a different portion (e.g., a lower or bottom portion) of the tapered portion 204 (and the channels 208). For example, the channels 208 can create paths for fluid (e.g., water, oil, mixtures, etc.) to flow from a top portion of the tapered portion 204 (and the channels 208) to a lower portion of the tapered portion 204 (and the channels 208). The width of the channels 208 can depend on the distance between adjacent/parallel threads 206. In some cases, the fluid diode 200 can be configured specifically for an annulus having a certain configuration (and/or range of configurations) and/or certain fluids (and/or fluid viscosities). The fluid diode 200 can be interchangeable and can be replaced by a different fluid diode with a different configuration (e.g., different shape, different channel dimensions, different configuration of threads, different number of fluid paths/channels, different capabilities) and/or capable of processing fluids with other or additional viscosities.

In some examples, the distance between parallel/adjacent threads (and thus the width of the channels 208) can depend on the type of fluid(s) and/or anticipated or estimated viscosity of the fluid(s) expected to flow through the channels 208. For example, if the channels 208 are intended to provide a fluid path for thicker oils or fluids having a threshold viscosity, the width of the channels 208 can be increased (e.g., relative to the width of the channels used to create a fluid path for thinner fluids or fluids with less than the threshold viscosity) to increase the flow rate of fluid through the channels 208, modify the pressure of fluid flowing through the channels 208, etc. In some cases, the width of the channels 208 can be determined based on a desired flow rate (or range of flow rates) of fluid(s) that will flow through the channels 208, the pressure (or range of pressures) of the fluid(s) that will flow through the channels 208, an anticipated or expected viscosity (or range of viscosities) of the fluid(s) that will flow through the channels 208, etc.

The fluid diode 200 can include a port 210 that creates an opening or ingress/egress area to an internal fluid path (not shown) inside of the fluid diode 200. The port 210 and the internal fluid path can provide a particular path (e.g., in addition to the path(s) created by the channels 208) for fluid traversing the fluid diode 200 to flow. In some examples, the port 210 and the internal fluid path can create a separate path for fluid flowing from a top or higher portion of the fluid diode 200 to a bottom or lower portion of the fluid diode 200, in addition to the path(s) created by the channels 208. For example, if the fluid traversing the fluid diode 200 has a viscosity above a threshold, the port 210 and the internal fluid path can prevent or limit clogging of the channels 208 and/or prevent a threshold drop in the pressure associated with the fluid flowing through the channels 208 than if the fluid diode 200 did not have the port 210 and the internal fluid path.

In other examples, the port 210 and the internal fluid path can be used as a reverse path for fluid(s) flowing through or across the fluid diode 200. In some cases, the port 210 and the internal fluid path can be used as a reverse path along with the path(s) created by the channels 208 (e.g., the path(s) created by the channels 208 and the path(s) created by the port 210 and the internal fluid path can be used as reverse paths for fluids). In some examples, the reverse path(s) for fluids can be used to steer polymers and/or other elements across the fluid diode 200. In some examples, the reverse path(s) for fluids can be used to control the differential pressure of fluid at different locations of the fluid diode 200 such as, for example, at a bottom portion of the fluid diode 200 and at a top portion of the fluid diode 200 or within the channels 208 and within the port 210 and the internal fluid path. In other cases, the port 210 and the internal fluid path can create a reverse fluid path relative to the path(s) created by the channels 208) for fluids traversing the fluid diode 200. For example, the channels 208 can create a path(s) for fluids in one direction and the port 210 and the internal fluid path can create a path(s) for fluids in a different (e.g., reverse) direction.

In some cases, the tapered portion 204 of the fluid diode 200 can optionally include one or more ports 212 that provide an egress and/or ingress area for fluids to flow through the internal path and/or one or more additional internal paths within the fluid diode 200. In some examples, the one or more ports 212 and the one or more internal paths associated with the one or more ports 212 can create one or more additional paths for fluids traversing across the fluid diode 200.

In some cases, the fluid diode 200 can include one or more viscometers (not shown) used to measure a viscosity of fluids flowing through the channels 208 and/or through the port 210 and the internal fluid path. For example, the fluid diode 200 can include a reader device that measures a differential pressure between the fluid flowing through the channels and the fluid flowing through the port 210 and the internal fluid path. The differential pressure can be used to determine the viscosity of a fluid(s) flowing through and/or across the fluid diode 200.

In some cases, the fluid diode 200 can be configured to rotate relative to a base element (e.g., base element 302 shown in FIGS. 3A and 3B) and/or a housing element (e.g., housing element 304 shown in FIGS. 3A and 3B) used to retain and/or contain the fluid diode 200. For example, the fluid diode 200 can be configured to rotate about a protruding element (e.g., protruding element 310 shown in FIG. 3A) of a base element (e.g., base element 302 shown in FIGS. 3A and 3B) used to retain and/or contain the fluid diode 200. Moreover, the fluid flowing through the channels 208 can apply a force to the threads 206 on the tapered portion of the fluid diode 200. The force applied to the threads 206 by fluid flowing through the channels 208 can create torque on the system. In some cases, the fluid diode 200 can include a sensor device (not shown) used to measure the torque on the system created by the fluid flowing through the channels 208. The torque can be measured using a variety of means such as, for example, magnetic, acoustic, imbedded strain gauges, etc.

In some cases, the channels 208 on the fluid diode 200 and the internal fluid path associated with the port 210 can prevent or limit drops in differential pressures of fluids flowing across the fluid diode 200, can prevent or limit the fluid diode 200 from becoming clogged, can prevent or limit the fluid diode 200 from becoming dirty by the fluid flowing across the fluid diode 200, can increase a dynamic range of fluid pressures, and/or can increase a sensitivity of viscosity sensors on the fluid diode 200. In some examples, the flow from fluids flowing through and/or across the fluid diode 200 can be used to modify (e.g., open, close, etc.) one or more orifices downstream or upstream (relative to a flow of fluid), activate and/or deactivate certain downstream and/or upstream devices, etc. For example, the fluid diode 200 can provide greater control of the pressure of fluids flowing through and/or across the fluid diode 200, which can provide greater control of the fluids (and/or associated pressure) used to perform one or more downstream or upstream actions, such as opening or closing an orifice downstream or upstream, which can provide better control of the one or more downstream or upstream actions. In some cases, the fluid diode 200 can self-regulate the flow of fluids (and/or the associated pressures) and/or any changes in pressure in one flow direction (e.g., up/upstream or down/downstream) versus another flow direction (e.g., up/upstream or down/downstream).

As previously noted, the viscosity of fluid flowing through and/or across the fluid diode 200 can be measured as a differential pressure between flows. In some examples, the reverse flow direction can have a significantly lower differential pressure than the flow direction opposite to the reverse flow direction. In some examples, if the fluid diode 200 is used in a system that experiences a loss of pressure or an up-stream pressure (e.g., as a result of a rupture or a blow down), the fluid diode 200 can act as a flow limiter similar to a surge check, and can allow a reduced flow to bleed down safely.

Figure 3A:
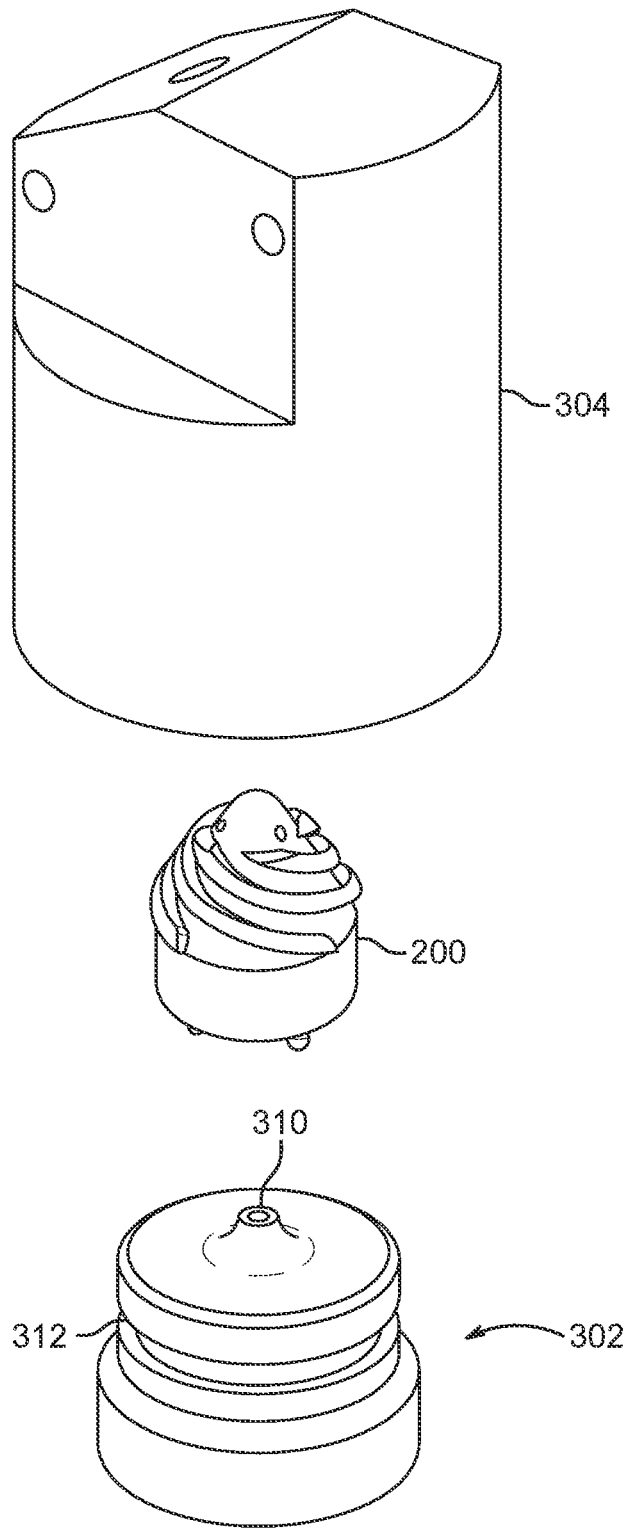
FIG. 3A is a diagram illustrating an example installation system for a fluid diode, in accordance with some examples of the present disclosure.

FIG. 3A is a diagram illustrating an example installation system for the fluid diode 200. In this example, the fluid diode 200 can be installed on a base element 302 and a housing element 304. The housing element 304 can be part of an annulus (e.g., an annulus of a drill string, an annulus of a wellbore tool, etc.) or can be attached or secured to an annulus. The housing element 304 can house the fluid diode 200. In some examples, a portion (e.g., an external or internal portion) of the housing element 304 can be tapered. For example, an internal and/or external portion of the housing element 304 can be tapered like or similar to the fluid diode 200. In some cases, the tapered portion of the housing element 304 can be tapered to match the tapering of the fluid diode 200.

In some cases, an internal portion of the housing element 304 can include threads similar to or matching the threads 206 on the fluid diode 200. For example, an internal portion of the housing element 304 can include threads matching the threads 206 of the fluid diode 200. In other cases, a surface of the internal portion of the housing element 304 can have a different configuration such as, for example and without limitation, a flat surface (or significantly flat), a curved surface, and/or any other surface configuration.

The fluid diode 200 can sit on the base element 302. In some examples, the fluid diode 200 can sit on a surface of the base element 302 and/or a protruding portion 310 of the base element 302. For example, the protruding portion 310 of the base element 302 can be inserted inside of a matching opening in a bottom of the fluid diode 200 to secure the fluid diode 200 on the base element 302. In some examples, the base element 302 can be part of an annulus. In other examples, the base element 302 can be separate from the annulus and/or attached to an annulus. In some cases, the base element 302 can include means for attaching or securing the base element 302 to the housing element 304. For example, the base element 302 can include threads or ridges that can secure the base element 302 to the housing element 304. When the base element 302 is secured to the housing element 304, the fluid diode 200 can be partially or totally housed within the base element 302 and the housing element 304 and/or protected from external elements (e.g., external to the base element 302 and the housing element 304).

In some examples, the base element 302 can include threads 312. The threads 312 can create a channel(s) that serve as a path for fluid flowing around and/or across the base element 302.

Figure 3B:
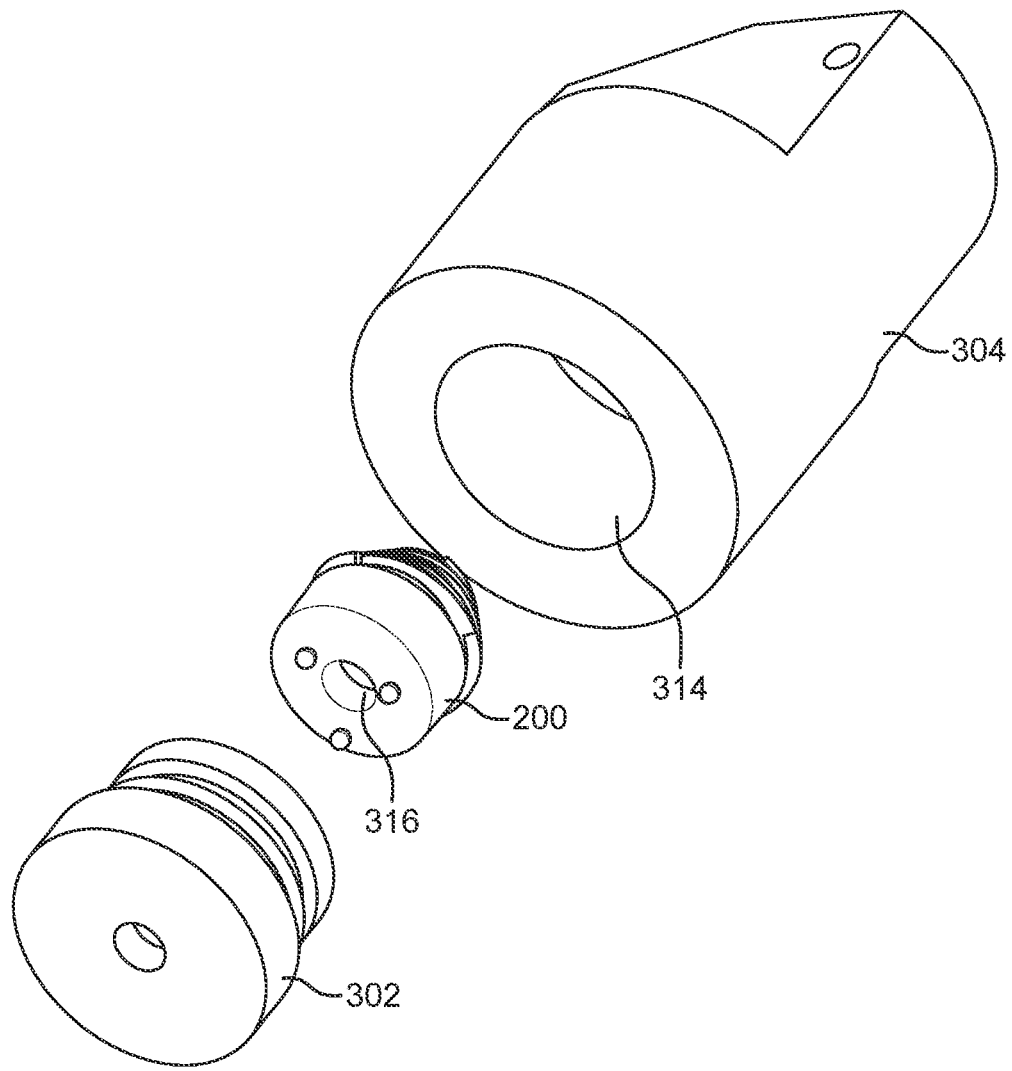
FIG. 3B is a diagram illustrating an example view of an example fluid diode, an example base element, and an example housing element in accordance with some examples of the present disclosure.

FIG. 3B is a diagram illustrating an example view of the fluid diode 200, the base element 302, and the housing element 304. As shown, the fluid diode 200 can sit on the base element 302 and inserted within an opening 314 of the housing element 304. The housing element 304 can sit on a portion of the base element 302 such that the fluid diode 200 is housed (e.g., covered) within the housing element 304 sitting on the base element 302.

Moreover, in some examples, the fluid diode 200 can include an opening 316 for receiving the protruding element 310 of the base element 302. The protruding element 310 can be inserted into the opening 316 of the fluid diode 200 in order to secure the fluid diode 200 to the base element 302.

Figure 4A:
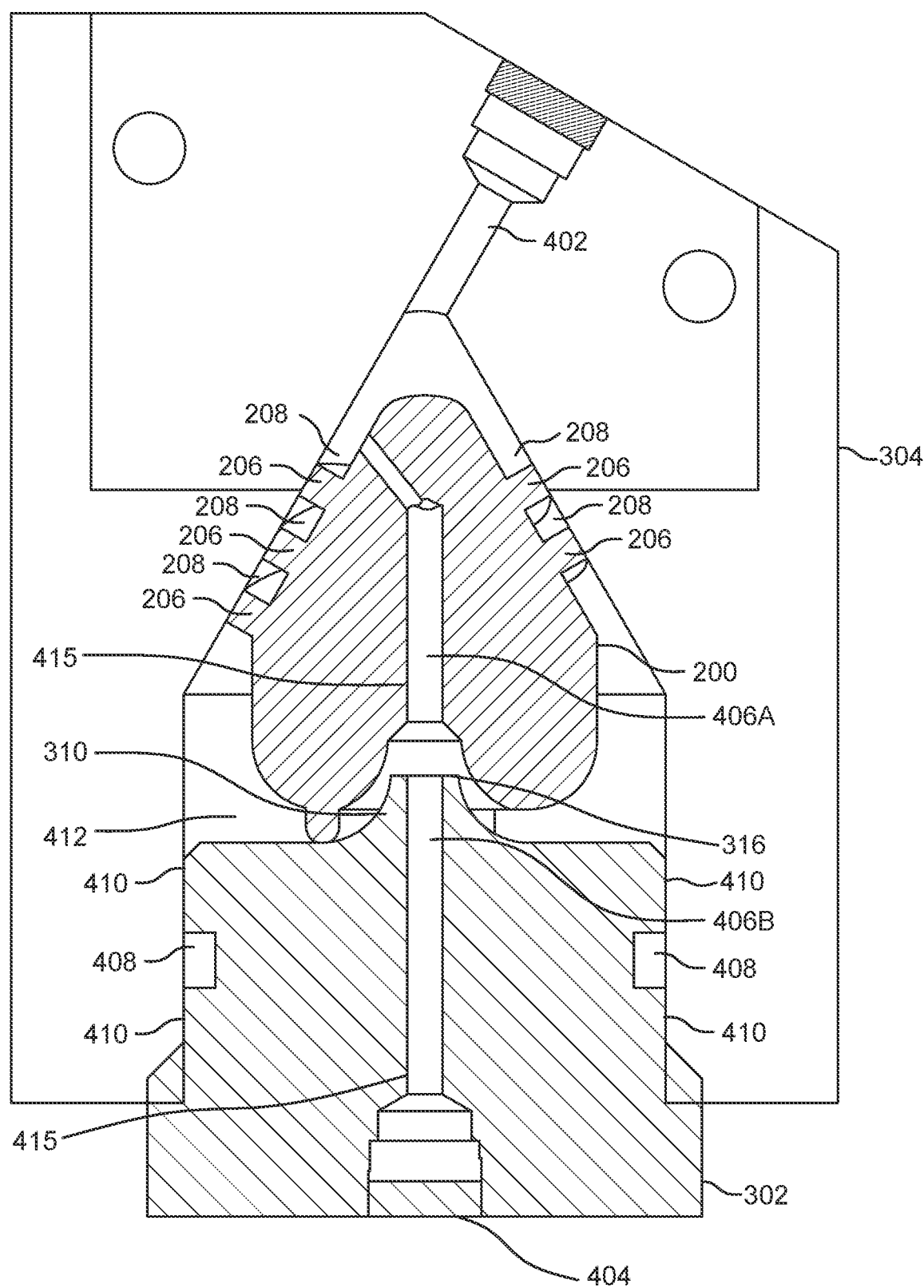
FIG. 4A is a diagram illustrating an example view of a fluid diode installed inside of a housing element, in accordance with some examples of the present disclosure.

FIG. 4A is a diagram illustrating an example view of a fluid diode 200 installed inside of a housing element, such as the housing element 304 shown in FIG. 3A and FIG. 3B.

In this example, the fluid diode 200 sits on the base element 302, and the fluid diode 200 and at least a portion of the base element 302 are contained/housed within a cavity 412 of the housing element 304. For example, the cavity 412 in the housing element 304 can be configured to be wide enough and deep enough to contain the fluid diode 200 and at least a portion of the base element 302. In other cases, the fluid diode 200 can be contained within the cavity 412 in the housing element 304 but the base element 302 can reside outside of the cavity 412 (and thus the housing element 304).

The fluid diode 200 can be secured to the base element 302 via one or more securing means. For example, the fluid diode 200 can be secured to the base element 302 by inserting the protruding element 310 on the base element 302 inside of the opening 316 in the fluid diode 200, as previously explained. The protruding element 310 can help secure the fluid diode 200 and/or hold the fluid diode 200 in place while it sits on the base element 302.

In some implementations, the dimensions (e.g., widths) of the fluid diode 200 and the cavity 412 inside of the housing element 304 that receives and contains the fluid diode 200 and at least a portion of the base element 302 can be configured such that when the fluid diode 200 is inside of the housing element 304, the threads 206 of the fluid diode 200 can make contact and/or press against interior walls (or surfaces thereof) of the housing element 304, as shown in FIG. 4A. By ensuring that the threads 206 of the fluid diode 200 make contact with and/or press against interior walls (or surfaces thereof) of the housing element 304, the fluid(s) that flow through the channels 208 on the fluid diode 200 created by the threads 206 can be contained/maintained within the channels 208. For example, the contact between the threads 206 and the interior walls of the housing element 304 can create a seal or barrier to prevent a fluid flowing through the channels 208 from moving to areas outside of the channels 208, such as gaps between the threads 206 and the interior walls of the housing element 304, and/or spilling from one channel to another.

The housing element 304 can include an opening 402 that allows fluids to enter and/or exit the housing element 304, and the base element 302 can similarly include an opening 404 that allows fluids to enter and/or exit the base element 302. The fluid diode 200 can include an internal path 406A for fluids flowing through the interior of the fluid diode 200 (e.g., in addition to or in lieu of any fluids flowing through the channels 208 on the exterior of the fluid diode 202 created by the threads 206), and the base element 302 can include an internal path 406B for fluids flowing from the internal path 406A on the fluid diode 200 to flow through the base element 302 (e.g., via the internal path 406B) and out of the base element 302 via the opening 404, and/or for fluids to flow through an interior of the base element 302 (e.g., via the internal path 406B) to the internal path 406A on the fluid diode 200 and out of the housing element 304 through the opening 402 on the housing element 304.

In some cases, the base element 302 can optionally include threads 410 used to create a channel(s) 408 for fluid to flow through an exterior of the base element 302. For example, the threads 410 on the base element 302 can form a channel(s) 408 which can be part of (e.g., a segment of) a fluid path for fluids to flow through an exterior of the fluid diode 200 and an exterior of the base element 302. Thus, as shown in FIG. 4A, the fluid diode 200, the base element 302, and the housing element 304 can form a first fluid path that includes the fluid channel 415, which includes the internal paths 406A and 406B, and a second fluid path that includes the channels 208 on the fluid diode 200 and the channel(s) 408 created by the threads 410 on the base element 302. In some examples, the first fluid path can be used to allow a fluid(s) to flow in one direction (e.g., from the opening 402 to the opening 404 or vice versa) and the second fluid path can be used to allow a fluid(s) to flow in an opposite or reverse direction. In other examples, the first fluid path and the second fluid path can be used to allow a fluid(s) to flow in a same direction via different paths.

Moreover, the multiple fluid paths (e.g., the first fluid path and the second fluid path as previously explained) can allow a measuring device to measure a differential pressure of the fluid(s) flowing through the multiple paths in order to determine a viscosity of the fluid(s). In some examples, the multiple fluid paths can provide better control (e.g., than having a single fluid path) of the pressure associated with fluids flowing through the multiple paths, better control of a drop in pressure (and/or a reduction in the range of pressure changes) of fluid flowing through one or more of the fluid paths such as a drop in pressure associated with fluid flowing in one fluid path (and/or a flow direction associated with that fluid path) relative to the pressure associated with fluid flowing in the other fluid path (and/or a flow direction associated with that fluid path), a better control of a flow rate of fluid flowing through one or more of the fluid paths, a better dynamic range and/or measuring sensitivity of a viscosity of fluids flowing through the fluid paths, control of the amount of torque created by fluid flowing through the channels 208, and/or better control of fluid flows, among other benefits.

In some examples, the dimensions (e.g., the widths) of the base element 302 and the cavity 412 in the housing element 304 can be configured to allow the threads 410 on the base element 302 used to create the channels 408 to make contact with and/or press against an interior wall (or a surface thereof) of the housing element 304. By ensuring that the threads 410 on the base element 302 make contact with and/or press against the interior wall (or surface thereof) of the housing element 304, the fluid(s) that flow through the channels 408 on the base element 302 created by the threads 410 can be contained/maintained within the channels 408. For example, a contact between the threads 410 and the interior wall of the housing element 304 can create a seal or barrier to prevent a fluid flowing through the channels 408 from moving to areas outside of the channels 408, such as gaps between the threads 410 and the interior wall of the housing element 304, and/or spilling outside of the channel 408.

As previously noted, the fluid diode 200 can be configured to rotate relative to the base element 302 and/or the housing element 304. For example, fluid flowing through the channels 208 can apply force to the threads 206 on the fluid diode 200, which can cause the fluid diode 200 to rotate about the protruding element 310 of the base element 302. The force applied to the threads 206 by the fluid flowing through the channels 208 can allow the fluid diode 200 to rotate without requiring electric power from an electric power source, and can thus reduce the amount of space needed to rotate the fluid diode 200 since the need for an electric power source is eliminated/obviated.

Figure 4B:
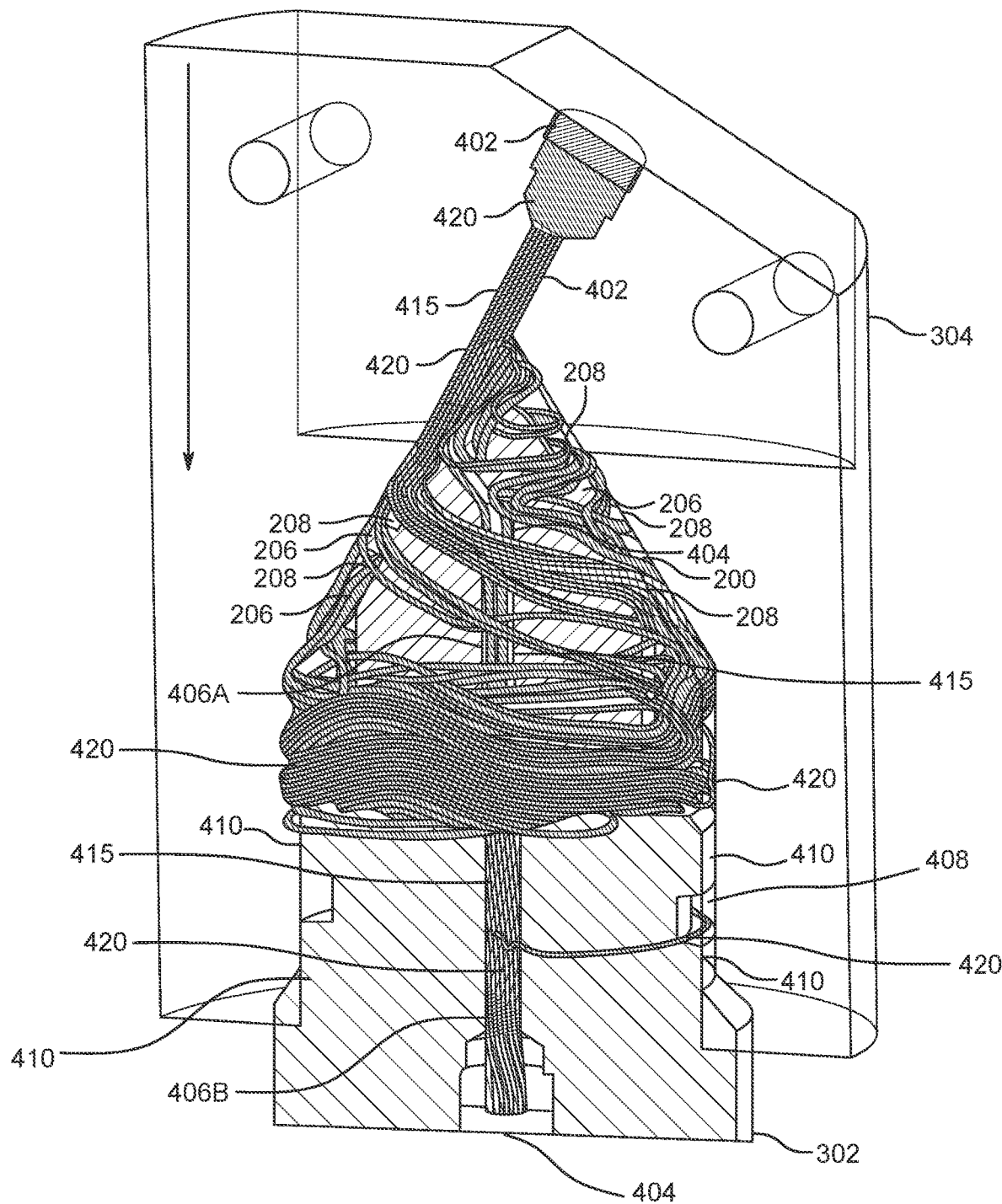
FIG. 4B is a diagram illustrating an example of fluid flowing through a fluid diode, in accordance with some examples of the present disclosure.

FIG. 4B is a diagram illustrating an example of fluid flowing through the fluid diode 200. In this example, a fluid 420 is shown flowing in a downward direction from the opening 402 on the housing element 304 to the opening 404 on the base element 302. The fluid 420 can include any fluid or fluid mixture such as, for example and without limitation, oil, water, oil and water, oil and gas, water and gas, and/or any other fluids or combination thereof.

The fluid 420 can flow down the channels 208 on the fluid diode 200 and the channel 408 on the base element 302. The fluid 420 can additionally or alternatively flow down an internal channel 415 (e.g., internal within the fluid diode 200 and the base element 302) that includes the internal paths 406A and 406B, as previously described. The velocity, flow rate, and/or pressure of the fluid 420 can vary at different points within the channels 208 and the internal channel 415. For example, the fluid 420 can have a higher velocity at various points from the opening 402 and across the internal channel 415 than at other points within the channels 208 and the channel 408.

In some examples, the pressure of the fluid 420 can vary at different channels and/or points within the channels. For example, the pressure of the fluid 420 at the internal channel 415 can be higher than the pressure of the fluid 420 at the channels 208 and/or the channel 408.

Figure 4C:
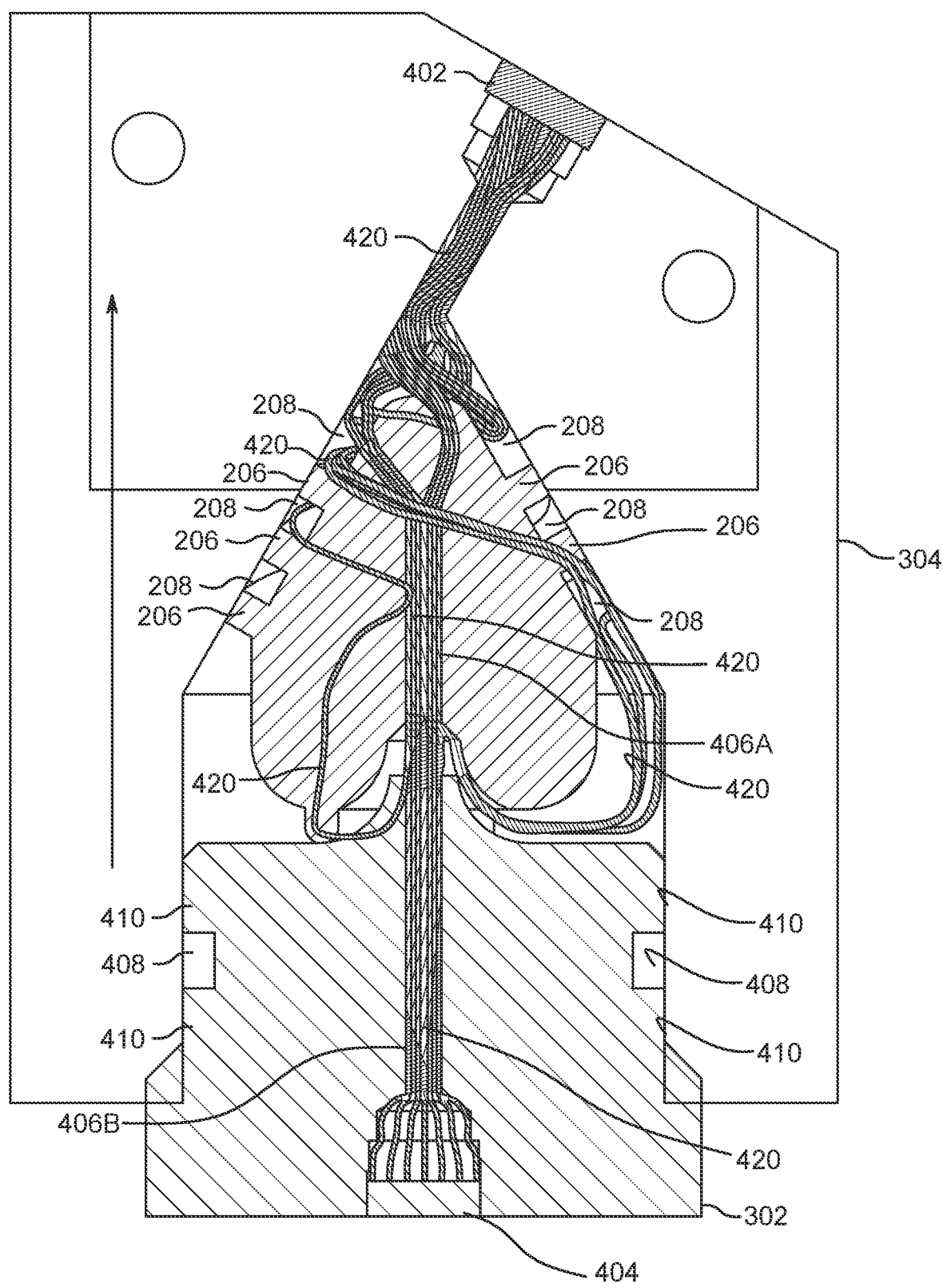
FIG. 4C is a diagram illustrating another example of fluid flowing through the fluid diode, in accordance with some examples of the present disclosure.

FIG. 4C is a diagram illustrating another example of fluid flowing through the fluid diode 200. In this example, the fluid 420 is shown flowing in an upward direction (e.g., a reverse direction) from the opening 404 on the base element 302 to the opening 402 on the housing element. As shown, when flowing in the upward or reverse direction, most of the fluid 420 flows through the internal channel 415. Moreover, in some examples, some of the fluid 420 flows or is diverted from the internal path 406B at the base element 302 to the channels 208 on the fluid diode 200 and toward the opening 402 on the housing element 304. In some cases, the velocity and/or the pressure of the fluid 420 can be greater when flowing through the internal channel 415 than when flowing through the channels 208 on the housing element 304.

Figure 5:
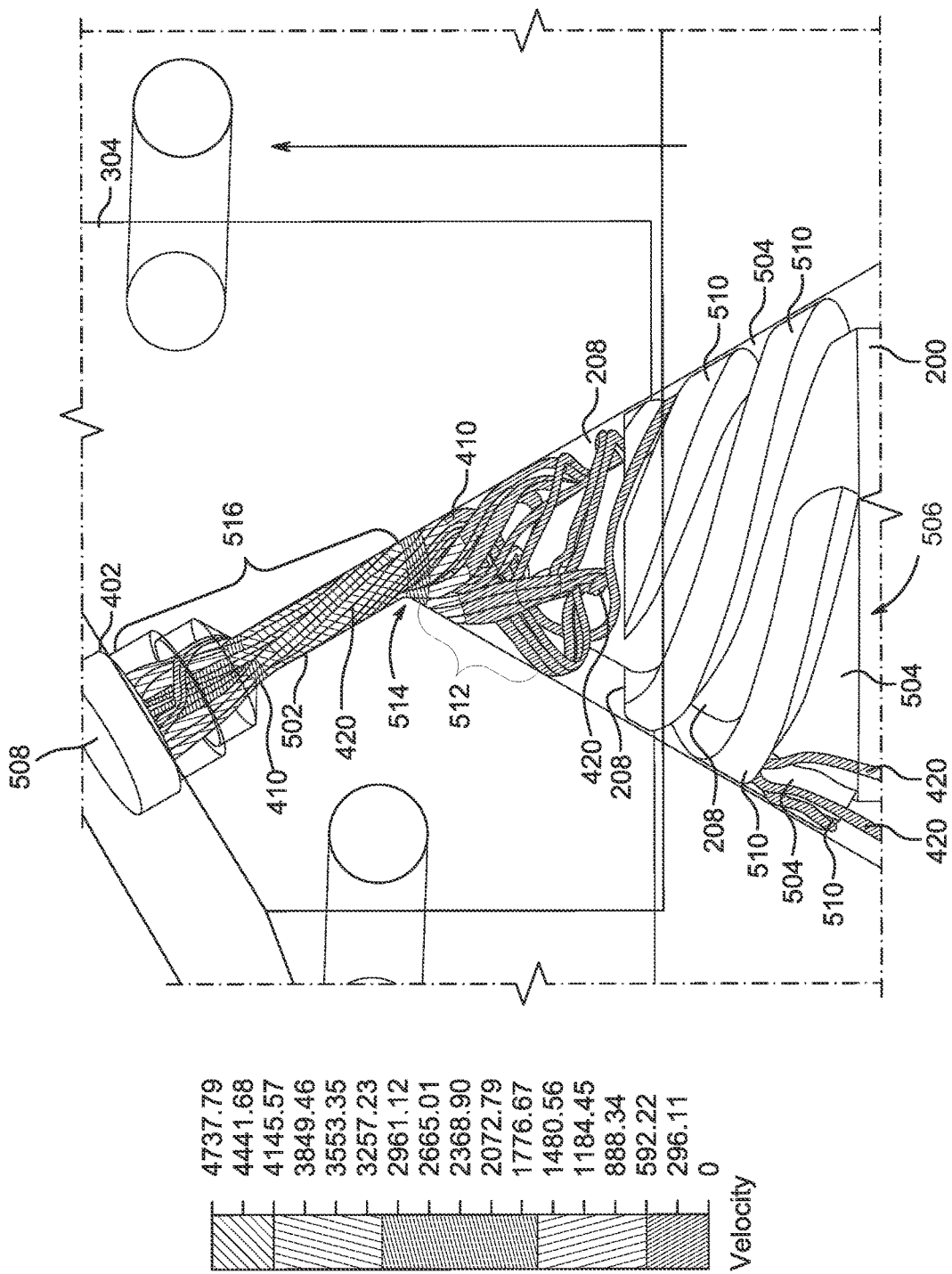
FIG. 5 is a diagram illustrating an example flow of fluid through a channel on an exterior of a fluid diode, in accordance with some examples of the present disclosure.

FIG. 5 is a diagram illustrating an example flow of fluid 420 through a channel 504 on an exterior of the fluid diode 500. Here, the fluid diode 200 is contained within the housing element 304, and the channel 504 can be formed by threads 510 on an exterior of the fluid diode 200, as previously explained.

In FIG. 5, the fluid 420 is shown flowing in an upward direction (e.g., a reverse direction) from a bottom portion 506 of the fluid diode 200 to an opening 402 on a top portion 508 of the housing element 304. The fluid 420 flows through the channel 504 on the fluid diode 200 and through a path 502 on the housing element 304 toward the opening 402 on the housing element 304. After flowing through the channel 504 on the fluid diode 200, the fluid 420 can egress the channel 504 (and the fluid diode 200) onto the path 502 on the housing element 304. The fluid 420 can continue through the path 502 and toward the opening 402 on the top portion 508 of the housing element 304. In some examples, the fluid 420 can exit the housing element 304 through the opening 402 on the top portion 508 of the housing element 304.

The velocity, flow rate, and/or the pressure of the fluid 420 flowing across the fluid diode 200 and the housing element 304 can vary at different points along the path of the fluid 420 from the bottom portion 506 of the fluid diode 200 to the top portion 508 of the housing element 304. For example, the velocity and the pressure of the fluid 420 can be lower when traversing the channel 504 on the fluid diode 200 than at least a portion of the path 502 on the housing element 304. However, in some cases, the flow rate of the fluid 420 can be higher when traversing a portion(s) of the channel 504 than when traversing a portion(s) of the path 502. To illustrate, the path 502 can include a choke point 514 that separates segments 512 and 516 of the path 502. The segment 512 of the path 502 has a larger cross-sectional area than the segment 516 of the path 502, and the choke point 514 can include a point along the path 502 where the cross-sectional area of the path 502 is reduced from the larger cross-sectional area of the segment 512 to the smaller cross-sectional area of the segment 516.

By reducing the cross-sectional area of the choke point 514 and the segment 516 relative to that of the segment 512, the choke point 514 (and the segment 516) can create a choked flow that reduces the total flow rate of the fluid 420 along the segment 516 (e.g., relative to the total flow rate of the fluid 420 along the segment 512) but increases the velocity and pressure/force of the fluid 420 along the segment 516 (e.g., relative to the velocity and pressure/force of the fluid 420 in the segment 512). Thus, when the fluid 420 exits the channel 504 and the fluid diode 200, and enters the path 502, the velocity and pressure of the fluid 420 can be lower when traversing the channel 504 on the fluid diode 200 and/or the segment 512 than when traversing the segment 516 of the path 502 at least partly because of a reduction in a size or diameter of the segment 516.

Figure 6A:
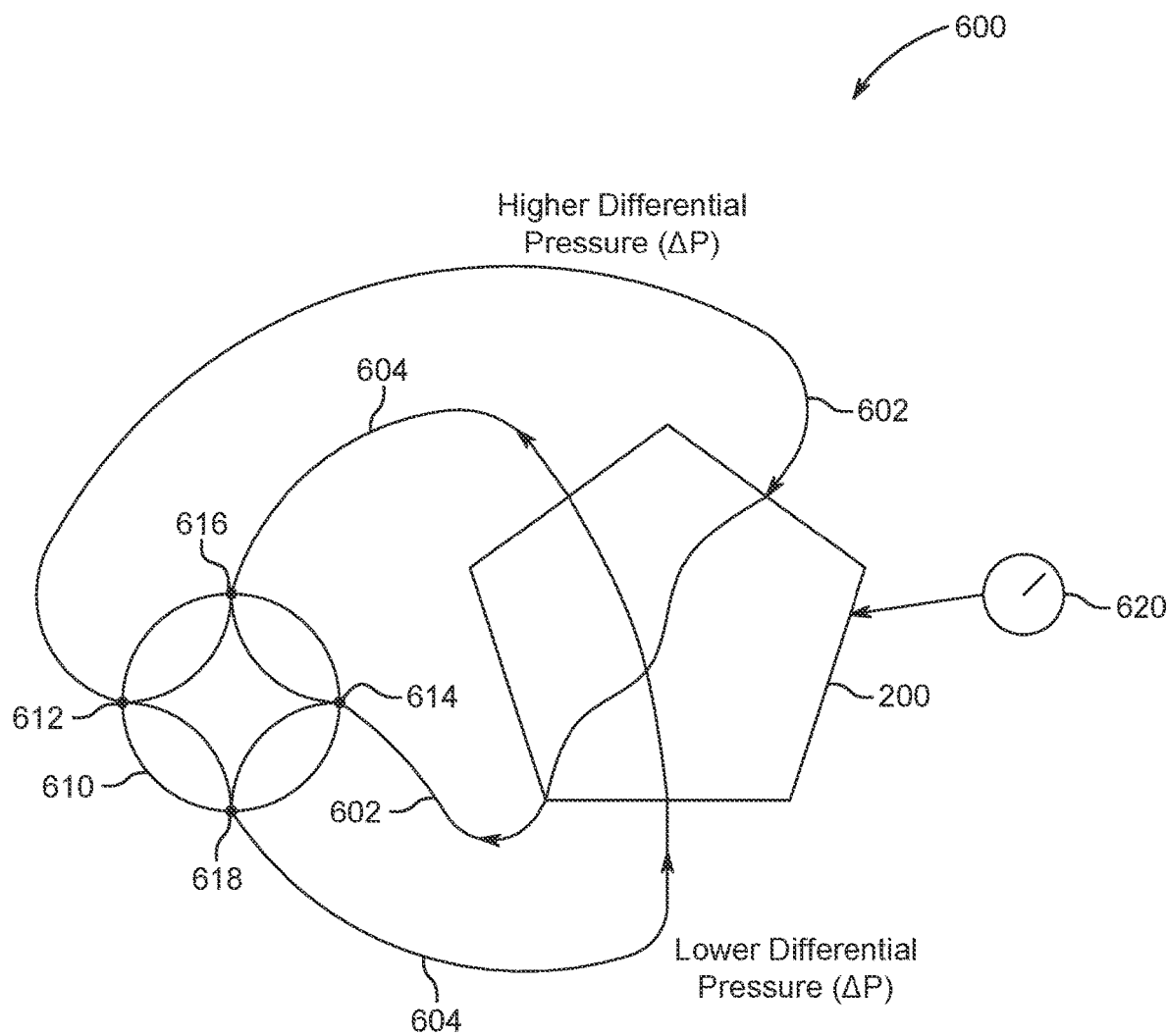
FIG. 6A is a diagram illustrating an example implementation of a system including a fluid diode, in accordance with some examples of the present disclosure.

FIG. 6A is a diagram illustrating an example implementation of a system 600 including the fluid diode 200. In some examples, the system 600 can include a measuring device 620 configured to measure one or more conditions. In some cases, the measuring device 620 can include multiple measuring devices, such as a viscometer and a torque gauge. In other cases, the measuring device 620 can include a single measuring device such as, for example, a viscometer or a torque gauge. Moreover, the measuring device 620 can be located at one or more locations within the system 600. For example, the measuring device 620 can be located on or within the fluid diode 200 and/or outside of the fluid diode 200.

In some examples, the measuring device 620 can include a torque gauge for measuring a torque created by a force applied to threads (e.g., threads 206) of the fluid diode 200 by fluid flowing through and/or across the fluid diode 200. The measuring device 620 can additionally or alternatively include a viscometer used to measure a viscosity of fluid traversing the fluid diode 200. In some examples, the measuring device 620 can determine the viscosity of fluid traversing the fluid diode 200 based on a differential pressure between the fluid at different fluid paths and/or different points within a fluid path. In the illustrative example of FIG. 6, fluid path 602 has a higher differential pressure (e.g., a differential pressure above a threshold) and fluid path 604 has a lower differential pressure (e.g., a differential pressure below a threshold). Thus, the fluid flowing through the fluid path 602 can have a higher viscosity than the fluid flowing through the fluid path 604.

In some implementations, the measurements (e.g., viscosity and/or torque) from the measuring device 620 can be used to determine one or more characteristics of downhole fluids and/or components. For example, the measurements from the measuring device 620 can be used to determine one or more characteristics of slurries and/or non-Newtonian systems downhole, such as for example and without limitation, a fluid viscosity, an impact of stress or force on the fluid viscosity, a flow rate, a pressure, etc.

The system 600 can optionally include a valve 610 for controlling and/or adjusting a flow of fluid through the system 600. In some examples, the valve 610 can include a multi-port valve, such as a four-port valve. For example, the valve 610 can include a port 612 connected to a portion of a fluid path 602, a port 614 connected to another portion of the fluid path 602, a port 616 connected to a portion of another fluid path 604 and a port 618 connected to another portion of the fluid path 604. The valve 610 can control the flow and/or direction of the flow of fluid along the fluid path 602 and/or the fluid path 604. For example, the valve can reverse or change a direction of a fluid flow in the system 600. In some cases, the valve 610 as well as the fluid path 602 and/or the fluid path 604 can be used to load a variable displacement pump that converts hydraulic (fluid) energy (e.g., from fluid flowing through the system 600) to mechanical energy and/or converts mechanical energy (e.g., from rotation of the fluid diode 200 as previously described) to hydraulic (fluid) energy.

In some cases, the fluid path 602 can have a different flow direction than the fluid path 604. For example, the fluid path 604 can have an opposite or reverse flow direction relative to a flow direction of the fluid path 602. In some cases, the flow direction of the fluid path 602 and/or the fluid path 604 can be controlled/adjusted via the valve 610, as previously explained.

FIG. 6B is a diagram illustrating example flows traversing the fluid diode 200. In this example, a flow 640 of fluid is depicted traversing the fluid diode 200 in one direction (e.g., flow direction 630 or flow direction 632) and another flow 642 of fluid is depicted traversing the fluid diode 200 in a different direction (e.g., flow direction 630 or flow direction 632).

The flow 640 can flow through a channel (e.g., channel 208) on the fluid diode 200 and the flow 642 can flow through an internal channel (e.g., fluid channel 415) on the fluid diode 200. In some examples, the channel (e.g., channel 208) associated with the flow 640 can include a channel created on a surface of the fluid diode 200, such as an external surface of the fluid diode 200.

In some cases, the flow 640 and the flow 642 (and/or the flow direction 630 and the flow direction 632) can include different pressure drops. For example, the flow 640 (and/or the flow direction 630) can include a first pressure drop and the flow 642 (and/or the flow direction 632) can include different pressure drop that is higher or lower than the first pressure drop associated with the flow 640 (and/or the flow direction 630).

The channels traversed by the flow 640 and the flow 642 can remain open in both directional configurations. For example, the channel traversed by the flow 640 can remain open in the flow direction 630 or the flow direction 632, and the channel traversed by the flow 642 can remain open in the flow direction 632 or the flow direction 630.

FIG. 7 is a flowchart illustrating an example process 700 for implementing a fluid diode. At block 702, the process 700 can include inserting a fluid diode (e.g., fluid diode 200) within a cavity (e.g., cavity 314) of a housing element (e.g., housing element 304). In some examples, the fluid diode can include a first fluid path for a first flow of fluid to traverse the fluid diode via a first flow direction and a second fluid path for a second flow of fluid to traverse the fluid diode via a second flow direction.

The first flow direction can be associated with or can include a first pressure drop and the second flow direction can be associated with or can include a second pressure drop that is different than the first pressure drop. Moreover, the first fluid path and the second fluid path can be configured to remain open to the first flow and the second flow in the first flow direction and the second flow direction.

At block 704, the process 700 can include coupling the fluid diode with a base element (e.g., base element 302).

At block 706, the process 700 can include measuring, via one or more measurement devices (e.g., measuring device 620), one or more characteristics of fluid flowing through the first fluid path and/or the second fluid path. In some cases, the one or more characteristics of the fluid can include a viscosity of the fluid at one or more locations and/or a torque associated with a force applied by the fluid on one or more threads (e.g., threads 206) on a surface of the fluid diode. In some examples, the second fluid path or the first fluid path can be formed at least partly by the one or more threads.

In some implementations, the base element and/or the housing element can be part of or coupled to an annulus of a drill string and/or a wellbore tool.

In some cases, the first fluid path can include one or more channels (e.g., channels 208) that traverse across an exterior surface of the fluid diode from one end of the fluid diode to a different end of the fluid diode. In some cases, the second fluid path can include an internal fluid channel between a first port of the fluid diode and a second port of the fluid diode. In some examples, the one or more channels further traverse across at least a portion of an additional exterior surface of the base element from one location of the base element to a different location of the base element. In some implementations, the second port of the fluid diode can be located at a bottom portion of the fluid diode.

In some aspects, the process 700 can include modifying, via a valve (e.g., valve 610) connected to the first fluid path and the second fluid path, the first flow of fluid through the first fluid path and/or the second flow of fluid through the second fluid path. In some examples, modifying the first flow of fluid or the second flow of fluid can include reversing the first flow of fluid or the second flow of fluid from one of the first flow direction and the second flow direction to a different one of the first flow direction and the second flow direction.

In some aspects, the process 700 can include transmitting fluid through the second fluid path from a first port of the fluid diode to a bottom portion of the base element. In some cases, the second fluid path can include an internal fluid channel within the fluid diode and an additional internal fluid channel from a portion of the base element coupled to the fluid diode to the bottom portion of the base element. Moreover, the base element can be removably and rotatably coupled to the fluid diode via a protruding element on the base element. In some examples, the protruding element on the base element connects the internal fluid channel within the fluid diode to the additional internal fluid channel.

FIG. 8 illustrates an example processor-based system with which some aspects of the subject technology can be implemented. Connection 805 can be a physical connection via a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, and/or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 can include an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 830 can include software services, servers, services, etc., that when the code that defines such software is executed by the processor 810, causes the system to perform a function. In some examples, a hardware service that performs a particular function can include the software component stored in a computer-readable medium in connection with the necessary hardware components, such as processor 810, connection 805, output device 835, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a fluid diode comprising a tapered portion having one or more channels on a surface of the tapered portion and an internal fluid channel, wherein the internal fluid channel is accessible from an exterior of the fluid diode via a first port on a first location of the fluid diode and traverses from the first port to a second port on a second location of the fluid diode; a base element removably coupled to the fluid diode; and a housing element configured to house the fluid diode.

Aspect 2. The system of Aspect 1, wherein the surface of the tapered portion of the fluid diode comprises one or more threads, and wherein the one or more threads form the one or more channels on the surface of the tapered portion of the fluid diode.

Aspect 3. The system of Aspect 1 or 2, further comprising an annulus of at least one of a drill string and a wellbore tool, wherein at least one of the base element and the housing element is part of the annulus or coupled to the annulus.

Aspect 4. The system of any of Aspects 1 to 3, wherein the one or more channels comprise a first fluid path that traverses across the exterior of the fluid diode from one end of the fluid diode to a different end of the fluid diode, and wherein the internal fluid channel comprises a second fluid path from the first port of the fluid diode to the second port of the fluid diode.

Aspect 5. The system of Aspect 4, wherein the one or more channels further traverse across at least a portion of an exterior of the base element from one location of the base element to a different location of the base element.

Aspect 6. The system of Aspect 4 or 5, wherein the second location of the fluid diode associated with the second port of the fluid diode is located at a bottom portion of the fluid diode.

Aspect 7. The system of any of Aspects 1 to 6, further comprising an internal fluid path from the first port of the fluid diode to a bottom portion of the base element, wherein the internal fluid path comprises the internal fluid channel and an additional internal fluid channel from a portion of the base element coupled to the fluid diode to the bottom portion of the base element.

Aspect 8. The system of Aspect 7, wherein the base element is removably and rotatably coupled to the fluid diode via a protruding element on the base element, and wherein the protruding element on the base element connects the internal fluid channel on the fluid diode to the additional internal fluid channel on the base element.

Aspect 9. The system of any of Aspects 1 to 8, further comprising one or more measuring devices comprising at least one of a viscometer configured to measure a viscosity of fluid traversing the fluid diode and a torque gauge configured to measure a torque generated by force applied by fluid flowing through the one or more channels on one or more threads of the fluid diode used to create the one or more channels.

Aspect 10. The system of any of Aspects 1 to 9, further comprising a valve connected to the one or more channels and the internal fluid channel, wherein the valve is configured to modify a flow of fluid through at least one of the one or more channels and the internal fluid channel.

Aspect 11. A method comprising: coupling a fluid diode with a base element, the fluid diode comprising a tapered portion having one or more channels on a surface of the tapered portion and an internal fluid channel, wherein the internal fluid channel is accessible from an exterior of the fluid diode via a first port on a first location of the fluid diode and traverses from the first port to a second port on a second location of the fluid diode; inserting the fluid diode coupled with the base element within a cavity of a housing element; and measuring, via one or more measurement devices, one or more characteristics of fluid flowing through at least one of the one or more channels and the internal fluid channel.

Aspect 12. The method of Aspect 11, wherein the one or more characteristics of the fluid comprise at least one of a viscosity of the fluid at one or more locations and a torque associated with a force applied by the fluid on one or more threads on the surface of the tapered portion of the fluid diode, wherein the one or more channels are created at least partly based on the one or more threads.

Aspect 13. The method of Aspect 11 or 12, wherein at least one of the base element and the housing element is part of or coupled to an annulus of at least one of a drill string and a wellbore tool.

Aspect 14. The method of any of Aspects 11 to 13, wherein the one or more channels comprise a first fluid path that traverses across the exterior of the fluid diode from one end of the fluid diode to a different end of the fluid diode, and wherein the internal fluid channel comprises a second fluid path from the first port of the fluid diode to the second port of the fluid diode.

Aspect 15. The method of Aspect 14, wherein the one or more channels further traverse across at least a portion of an exterior of the base element from one location of the base element to a different location of the base element.

Aspect 16. The method of Aspect 14 or 15, wherein the second location of the fluid diode associated with the second port of the fluid diode is located at a bottom portion of the fluid diode.

Aspect 17. The method of any of Aspects 11 to 16, further comprising modifying, via a valve connected to the one or more channels and the internal fluid channel, a flow of fluid through at least one of the one or more channels and the internal fluid channel.

Aspect 18. The method of Aspect 17, wherein modifying the flow of fluid comprises reversing the flow of fluid from a first direction to a second direction.

Aspect 19. The method of any of Aspects 11 to 18, further comprising transmitting fluid through an internal fluid path from the first port of the fluid diode to a bottom portion of the base element, wherein the internal fluid path comprises the internal fluid channel and an additional internal fluid channel from a portion of the base element coupled to the fluid diode to the bottom portion of the base element.

Aspect 20. The method of Aspect 19, wherein the base element is removably and rotatably coupled to the fluid diode via a protruding element on the base element, and wherein the protruding element on the base element connects the internal fluid channel on the fluid diode to the additional internal fluid channel on the base element.

Aspect 21. A system comprising: a fluid diode comprising a first fluid path for a first flow of fluid to traverse the fluid diode via a first flow direction and a second fluid path for a second flow of fluid to traverse the fluid diode via a second flow direction, wherein the first flow direction is associated with a first pressure drop and the second flow direction is associated with a second pressure drop that is different than the first pressure drop, and wherein the first fluid path and the second fluid path are configured to remain open to the first flow and the second flow in the first flow direction and the second flow direction.

Aspect 22. The system of Aspect 21, further comprising a housing element configured to house the fluid diode and a base element removably coupled to the fluid diode.

Aspect 23. The system of Aspect 21 or 22, wherein the first fluid path comprises one or more channels on a surface of the fluid diode and wherein the second fluid path comprises an internal fluid channel, wherein the internal fluid channel is accessible from an exterior of the fluid diode via a first port on a first location of the fluid diode and traverses from the first port to a second port on a second location of the fluid diode.

Aspect 24. The system of Aspect 23, wherein at least a portion of the fluid diode comprises one or more threads, and wherein the one or more threads form the one or more channels on the surface of the fluid diode.

Aspect 25. The system of Aspect 24, wherein the portion of the fluid diode comprises a tapered shape.

Aspect 26. The system of any of Aspects 21 to 25, further comprising an annulus of at least one of a drill string and a wellbore tool, wherein at least one of a base element removably coupled to the fluid diode and a housing element configured to house the fluid diode is part of the annulus or coupled to the annulus.

Aspect 27. The system of any of Aspects 21 to 26, wherein the first fluid path traverses across an exterior of the fluid diode from one end of the fluid diode to a different end of the fluid diode, and wherein the second fluid path comprises an internal fluid channel from a first port on the fluid diode to a second port on the fluid diode.

Aspect 28. The system of Aspects 21 to 27, wherein the first fluid path comprises one or more channels that traverse across an exterior surface of the fluid diode from one end of the fluid diode to a different end of the fluid diode, and wherein the second fluid path comprises an internal fluid channel from a first port of the fluid diode to a second port of the fluid diode.

Aspect 29. The system of Aspect 28, wherein the one or more channels further traverse across at least a portion of an additional exterior surface of a base element removably coupled to the fluid diode.

Aspect 30. The system of any of Aspects 28 to 29, wherein the second port of the fluid diode is located at a bottom portion of the fluid diode.

Aspect 31. The system of any of Aspects 28 to 30, wherein the second fluid path further comprises an additional internal fluid channel on a base element coupled to the fluid diode, the additional internal fluid channel traversing between the second port of the fluid diode and a bottom portion of the base element.

Aspect 32. The system of Aspect 31, wherein the base element is removably and rotatably coupled to the fluid diode via a protruding element on the base element, and wherein the protruding element on the base element connects the internal fluid channel on the fluid diode to the additional internal fluid channel on the base element.

Aspect 33. The system of any of Aspects 21 to 32, further comprising one or more measuring devices comprising at least one of a viscometer configured to measure a viscosity of fluid traversing the fluid diode and a torque gauge configured to measure a torque generated by force applied by fluid flowing through the second fluid path on one or more threads of a surface of the fluid diode used to create the second fluid path.

Aspect 34. The system of any of Aspects 21 to 33, further comprising a valve connected to the first fluid path and the second fluid path, wherein the valve is configured to modify a fluid flow through at least one of the first fluid path and the second fluid path.

Aspect 35. A method comprising: inserting a fluid diode within a cavity of a housing element, the fluid diode comprising a first fluid path for a first flow of fluid to traverse the fluid diode via a first flow direction and a second fluid path for a second flow of fluid to traverse the fluid diode via a second flow direction, wherein the first flow direction is associated with a first pressure drop and the second flow direction is associated with a second pressure drop that is different than the first pressure drop, and wherein the first fluid path and the second fluid path are configured to remain open to the first flow and the second flow in the first flow direction and the second flow direction; coupling the fluid diode with a base element; and measuring, via one or more measurement devices, one or more characteristics of fluid flowing through at least one of the first fluid path and the second fluid path.

Aspect 36. The method of Aspect 35, wherein the one or more characteristics of the fluid comprise at least one of a viscosity of the fluid at one or more locations and a torque associated with a force applied by the fluid on one or more threads on a surface of the fluid diode, wherein the second fluid path is formed at least partly by the one or more threads.

Aspect 37. The method of Aspect 35 or 36, wherein at least one of the base element and the housing element is part of or coupled to an annulus of at least one of a drill string and a wellbore tool.

Aspect 38. The method of any of Aspects 35 to 37, wherein the first fluid path comprises one or more channels that traverse across an exterior surface of the fluid diode from one end of the fluid diode to a different end of the fluid diode, and wherein the second fluid path comprises an internal fluid channel between a first port of the fluid diode and a second port of the fluid diode.

Aspect 39. The method of Aspect 38, wherein the one or more channels further traverse across at least a portion of an additional exterior surface of the base element from one location of the base element to a different location of the base element.

Aspect 40. The method of any of Aspects 38 to 39, wherein the second port of the fluid diode is located at a bottom portion of the fluid diode.

Aspect 41. The method of any of Aspects 35 to 40, further comprising modifying, via a valve connected to the first fluid path and the second fluid path, a fluid flow through at least one of the first fluid path and the second fluid path.

Aspect 42. The method of Aspect 41, wherein modifying the flow of fluid comprises reversing the fluid flow from the first flow direction to the second flow direction.

Aspect 43. The method of any of Aspects 35 to 42, further comprising transmitting fluid through the second fluid path from a first port of the fluid diode to a bottom portion of the base element, wherein the second fluid path comprises an internal fluid channel within the fluid diode and an additional internal fluid channel from a portion of the base element coupled to the fluid diode to the bottom portion of the base element.

Aspect 44. The method of Aspect 43, wherein the base element is removably and rotatably coupled to the fluid diode via a protruding element on the base element, and wherein the protruding element on the base element connects the internal fluid channel within the fluid diode to the additional internal fluid channel.

Aspect 45. A system comprising means for performing a method according to any of Aspects 35 to 44.

Aspect 46. A non-transitory computer-readable medium having stored thereon instructions which, when executed by one or more processors, cause the one or more processors to perform a method according to any of Aspects 35 to 44.

Aspect 47. A computer program product having stored thereon instructions which, when executed by one or more processors, cause the one or more processors to perform a method according to any of Aspects 35 to 44.

What is claimed is:

1. A system comprising:
a fluid diode comprising a first fluid path for a first flow of fluid to traverse the fluid diode via a first flow direction and a second fluid path for a second flow of fluid to traverse the fluid diode via a second flow direction, wherein the first flow direction is associated with a first pressure drop and the second flow direction is associated with a second pressure drop that is different than the first pressure drop, and wherein the first fluid path and the second fluid path are configured to remain open to the first flow and the second flow in the first flow direction and the second flow direction; and wherein the first fluid path traverses across an exterior of the fluid diode from one end of the fluid diode to a different end of the fluid diode, and wherein the second fluid path comprises an internal fluid channel from a first port on the fluid diode to a second port on the fluid diode.

2. The system of claim 1, further comprising a housing element configured to house the fluid diode and a base element removably coupled to the fluid diode.

3. The system of claim 1, wherein the first fluid path that traverses across the exterior of the fluid diode comprises one or more channels on a surface of the fluid diode.

4. The system of claim 3, wherein at least a portion of the fluid diode comprises one or more threads, and wherein the one or more threads form the one or more channels on the surface of the fluid diode.

5. The system of claim 4, wherein the portion of the fluid diode comprises a tapered shape.

6. The system of claim 3, wherein the one or more channels further traverse across at least a portion of an additional exterior surface of a base element removably coupled to the fluid diode.

7. The system of claim 1, further comprising an annulus of at least one of a drill string and a wellbore tool, wherein at least one of a base element removably coupled to the fluid diode and a housing element configured to house the fluid diode is part of the annulus or coupled to the annulus.

8. The system of claim 1, wherein the second port of the fluid diode is located at a bottom portion of the fluid diode.

9. The system of claim 1, wherein the second fluid path further comprises an additional internal fluid channel on a base element coupled to the fluid diode, the additional internal fluid channel traversing between the second port of the fluid diode and a bottom portion of the base element.

10. The system of claim 9, wherein the base element is removably and rotatably coupled to the fluid diode via a protruding element on the base element, and wherein the protruding element on the base element connects the internal fluid channel on the fluid diode to the additional internal fluid channel on the base element.

11. The system of claim 1, further comprising one or more measuring devices comprising at least one of a viscometer configured to measure a viscosity of fluid traversing the fluid diode and a torque gauge configured to measure a torque generated by force applied by fluid flowing through the first fluid path on one or more threads of a surface of the fluid diode used to create the first fluid path.

12. The system of claim 1, further comprising a valve connected to the first fluid path and the second fluid path, wherein the valve is configured to modify a fluid flow through at least one of the first fluid path and the second fluid path.

13. A method comprising:
inserting a fluid diode within a cavity of a housing element, the fluid diode comprising a first fluid path for a first flow of fluid to traverse the fluid diode via a first flow direction and a second fluid path for a second flow of fluid to traverse the fluid diode via a second flow direction, wherein the first flow direction is associated with a first pressure drop and the second flow direction is associated with a second pressure drop that is different than the first pressure drop, and wherein the first fluid path and the second fluid path are configured to remain open to the first flow and the second flow in the first flow direction and the second flow direction;

coupling the fluid diode with a base element;

wherein the first fluid path traverses across an exterior of the fluid diode from one end of the fluid diode to a different end of the fluid diode, and wherein the second fluid path comprises an internal fluid channel from a first port on the fluid diode to a second port on the fluid diode; and measuring, via one or more measurement devices, one or more characteristics of fluid flowing through at least one of the first fluid path and the second fluid path.

14. The method of claim 13, wherein the one or more characteristics of the fluid comprise at least one of a viscosity of the fluid at one or more locations and a torque associated with a force applied by the fluid on one or more threads on a surface of the fluid diode, wherein the first fluid path is formed at least partly by the one or more threads.

15. The method of claim 13, wherein at least one of the base element and the housing element is part of or coupled to an annulus of at least one of a drill string and a wellbore tool.

16. The method of claim 13, wherein the first fluid path that traverses across an exterior of the fluid diode comprises one or more channels.

17. The method of claim 16, wherein the one or more channels further traverse across at least a portion of an additional exterior surface of the base element from one location of the base element to a different location of the base element.

18. The method of claim 13, further comprising modifying, via a valve connected to the first fluid path and the second fluid path, one of the first fluid flow through the first fluid path or the second fluid flow through the second fluid path.

* * * * *